United States Patent
Mita et al.

(10) Patent No.: US 6,848,167 B2
(45) Date of Patent: Feb. 1, 2005

(54) APPARATUS AND METHOD FOR SEPARATING HEAD GIMBAL ASSEMBLY FROM BONDING JIG

(75) Inventors: Yasuhiro Mita, Fujisawa (JP); Kohichiroh Naka, Fujisawa (JP); Takuya Satoh, Hayama-machi (JP); Tatsumi Tsuchiya, Ayase (JP); Tatsushi Yoshida, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 09/879,514

(22) Filed: Jun. 12, 2001

(65) Prior Publication Data

US 2001/0054225 A1 Dec. 27, 2001

(51) Int. Cl.⁷ .................................................. G11B 5/42
(52) U.S. Cl. .................... 29/603.02; 29/281.3; 29/426.1
(58) Field of Search ............................. 29/281.1, 281.3, 29/281.4, 281.5, 426.1, 426.5, 426.6, 603.02, 762

(56) References Cited

U.S. PATENT DOCUMENTS

| 4,391,035 A | * | 7/1983 | Van de Bult | 29/467 |
| 5,119,537 A | * | 6/1992 | Hamanaka et al. | 29/603.03 |
| 5,553,374 A | * | 9/1996 | Hanks et al. | 29/281.3 |

* cited by examiner

*Primary Examiner*—Gregory Huson
*Assistant Examiner*—Peter deVore
(74) *Attorney, Agent, or Firm*—Abdy Raissinia; Bracewell & Patterson, L.L.P.

(57) ABSTRACT

A head gimbal assembly, which is a component of a hard disk drive, has a bending portion that has elasticity and is bent at a predetermined angle under an unloaded condition, and a slider is bonded to a holding portion thereof by mounting the head gimbal assembly on a bonding jig in a state in which the bending portion is stretched. When the head gimbal assembly is separated from the bonding jig after bonding, the bending portion is not restored freely, so that the head gimbal assembly is caught by the bonding jig during the separating process and a locked state is sometimes established.

6 Claims, 9 Drawing Sheets

APPARATUS AND METHOD FOR SEPARATING HEAD GIMBAL ASSEMBLY FROM BONDING JIG

BACKGROUND OF THE INVENTION

1. Technical Field

The present invention relates to a construction of a bonding jig used in a process for manufacturing a head gimbal assembly (hereinafter referred to as an HG assembly), which is a component of a hard disk drive, and a method for separating the HG assembly from the bonding jig.

2. Description of the Related Art

Figure 7A:
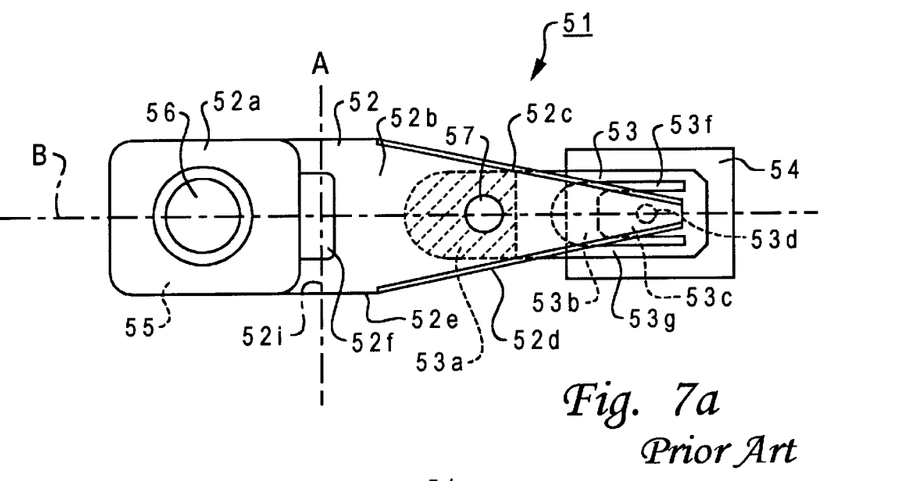
Figure 7B:
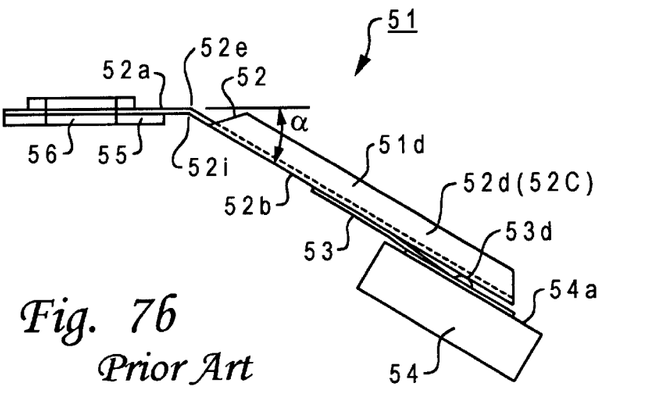
Figure 7C:
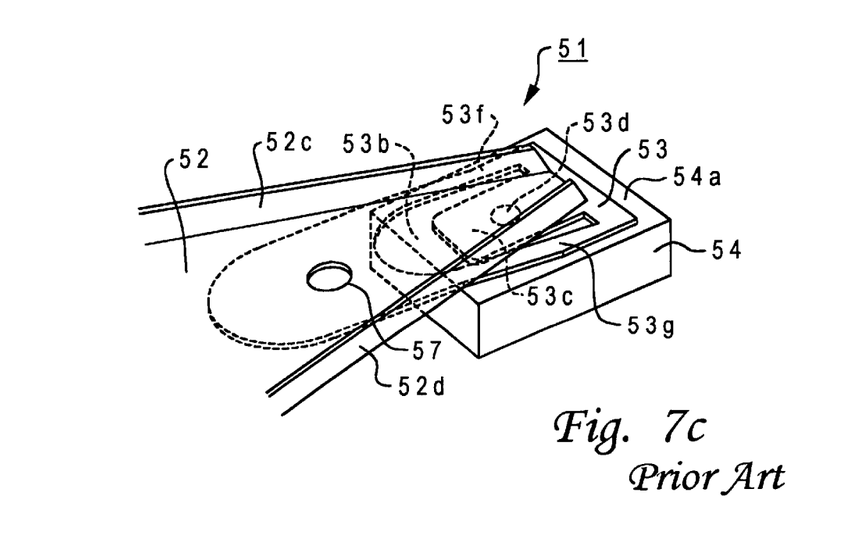

FIG. 7 shows a construction of an essential part of a general HG assembly. FIG. 7A is a top plan view thereof, FIG. 7B is a front view thereof, and FIG. 7C is a perspective view of a tip end portion of the HG assembly.

As shown in these figures, an HG assembly 51 is made up of a load beam 52, a flexure 53, a slider 54, and mount plates 55. The mount plates 55 are formed along the upper and lower surfaces of a mounting portion 52a of the load beam 52, in which an attachment hole 56 for attaching the HG assembly 51 is formed, so as to hold the mounting portion 52a therebetween to reinforce the mounting portion 52a of the load beam 52.

In FIG. 7, the shape and dimension proportion of each element such as the slider 54 of the HG assembly 51 are shown by changing them from the actual ones for ease of understanding. A load portion 52b in a tapered shape of the load beam 52 has folded portions 52c and 52d formed by bending both edge portions of the load portion 52b at right angles, by which the rigidity of the load portion 52b is kept. A hinge portion 52e, at which the folded portions are not formed, is formed with an opening 52f to provide elasticity, and is bent at a predetermined bending angle α with a portion 52i indicated by the indicating line A passing through the opening 52f being a boundary. This bend is caused by plastic deformation, so that this angle α is kept in an unloaded state. However, FIG. 7A shows a state in which the hinge portion 52e is not bent to simplify the explanation.

The flexure 53 is configured so that a bonding portion 53a indicated by the hatching in FIG. 7A is bonded and fixed to the lower surface of the load beam 52, and an arch-shaped notch 53b is formed in the range from an unfixed intermediate portion to a tip end portion. A flexure tongue 53c formed by the arch-shaped notch 53b is formed with a pivot 53d projecting upward. At a stage at which the flexure 53 is fixed to the load beam 52, the tip end portion of the pivot 53d comes into contact with the lower part of the load beam 52 at one point, and other portions of the flexure 53 keep a state in which they are slightly separated from the load beam 52.

On the other hand, a pair of flexure arms 53f and 53g, which are formed by the arch-shaped notch 53b and are elongated in the lengthwise direction, act as springs at this time. Specifically, the flexure arms 53f and 53g are curved slightly so that the tip end portion of the pivot 53d is pressed on the lower part of the load beam 52 in order to keep this state. Therefore, the flexure tongue 53c is slightly turnable in all directions around the contact point of the pivot 53d while having a restoring force.

Also, the HG assembly 51 has an alignment hole 57 formed in the fixing portion 53a so that the center thereof is located on the centerline B connecting the center of the pivot 53d and the center of the attachment hole 56. To a bonding face on the lower surface of the flexure tongue 53c is bonded a bonding portion on an upper surface 54a of the slider 54 with a predetermined adhesive or the like as described below. Therefore, the aforementioned flexure arms 53f and 53g, the flexure tongue 53c, and the pivot 53d constitute a suspension portion of the HG assembly 51 for suspending the slider 54.

Figure 8A:
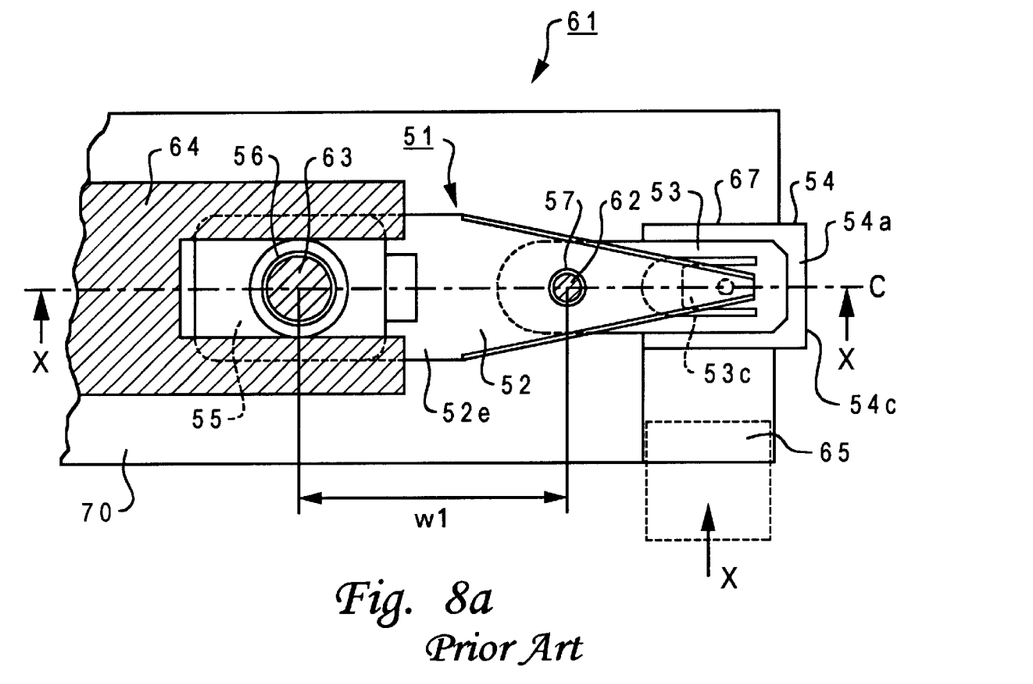
FIG. 8A is a top plan view of an essential part in the case where a flexure tongue 53c and a slider 54 are mounted on a bonding jig 61 to bond and fix the slider 54 to the flexure tongue 53c.
Figure 8B:
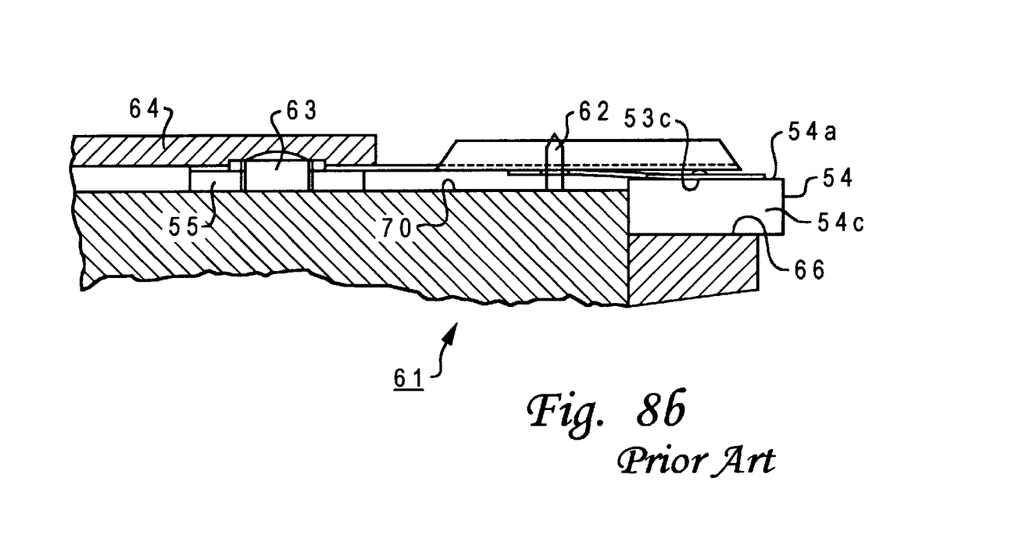
FIG. 8B is a sectional view of the essential part, in which a cross section including the reference line C passing through the centers of an alignment pin 62 and an action pin 63 is viewed in the direction of the arrow mark X.

FIG. 8A is a top plan view of an essential part in the case where the flexure tongue 53c and the rectangular parallelepiped slider 54 are mounted to a bonding jig 61 to bond and fix these two elements to each other. FIG. 8B is a sectional view of the essential part, in which a cross section including the reference line C passing through the centers of an alignment pin 62 and an action pin 63 standing on an upper surface 70 of the bonding jig 61 is viewed in the direction of the arrow mark X.

When the slider 54 is bonded to the flexure tongue 53c, the slider 54 with a predetermined orientation is mounted on a slider mount 66. The configuration is such that a fixing lever 65 lies at the position indicated by the dotted line at this time not to hinder the work. At a stage at which the slider 54 has been mounted, the fixing lever 65 is moved in the direction of the arrow mark X and presses the slider 54 with a predetermined urging force to hold the slider 54 between the fixing lever 65 and an opposite side wall portion 67. Thereby, the slider 54 is held at a slider mounting portion formed by the slider mount 66, the side wall portion 67, and the fixing lever 65. The configuration is such that the upper surface 54a and a tip end surface 54c of the slider project from each of adjacent parallel surfaces of the bonding jig 61 through a predetermined width at this time.

On the other hand, when the HG assembly 51 to which the slider 54 has not been bonded is mounted to the bonding jig 61, the HG assembly 51 is mounted so that the alignment pin 62 of the bonding jig 61 is inserted in the alignment hole 57 in the HG assembly 51, and the action pin 63 of the bonding jig 61 is inserted in the attachment hole 56 in the HG assembly 51. The configuration is such that a clamper 64 is moved to a position at which the mounting operation is not hindered by a not illustrated means at this time.

Also, in the HG assembly 51, the center distance w1 between the alignment pin 62 and the action pin 63 standing on the bonding jig 61 is set so as to be substantially equal to the center distance between the alignment hole 57 and the attachment hole 56 in a state in which the bend at the angle α is stretched straight as shown in FIG. 7A. Therefore, at a stage at which the HG assembly 51 is mounted on the bonding jig 61, the HG assembly 51 is in a state of being stretched as shown in FIG. 8. In this state, the clamper 64 is moved to the position shown in FIG. 8, and the mount plate 55 of the HG assembly 51 is pressed on and fixed to the upper surface 70 of the bonding jig 61 with a predetermined pressing force.

Thereby, the upper surface 54a of the slider 54 and the lower surface of the flexure tongue 53c keep a state of being pressed on each other with a predetermined pressure. Therefore, an adhesive with low elasticity such as an epoxy adhesive is applied to either one bonding surface before these elements are joined, and this bonding state is kept during a subsequent predetermined drying process, by which these two elements can be bonded firmly or in a temporarily fixed state.

After the slider 54 is bonded to the flexure tongue 53c as described above, the HG assembly 51 is separated from the bonding jig 61. For this purpose, the fixing lever 65 pressing the slider 54 is moved again to the position indicated by the dotted line, and the clamper 64 is moved from the state shown in FIG. 8, that is, the state of pressing the mount plate 55 of the HG assembly 51, thereby releasing the HG assembly 51 from the pressed state. At this time, the HG assembly 51 tends to be restored to the state in which the bending angle β (FIGS. 9a and 9b) at the bending portion 52i becomes the aforementioned predetermined angle α.

Figure 9A:
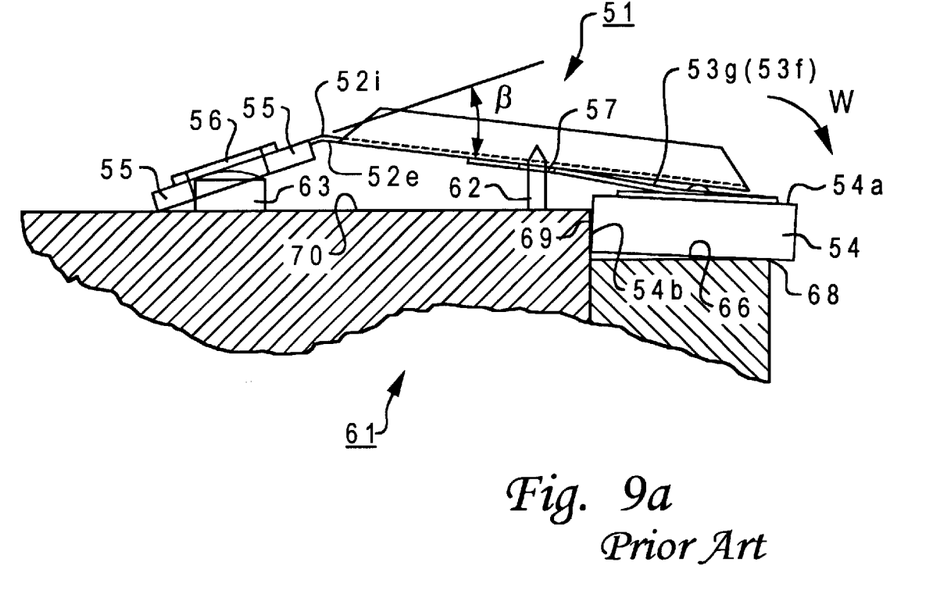
FIG. 9A is an explanatory view showing a status of an HG assembly when the hold of a clamper 64 is released.
Figure 9B:
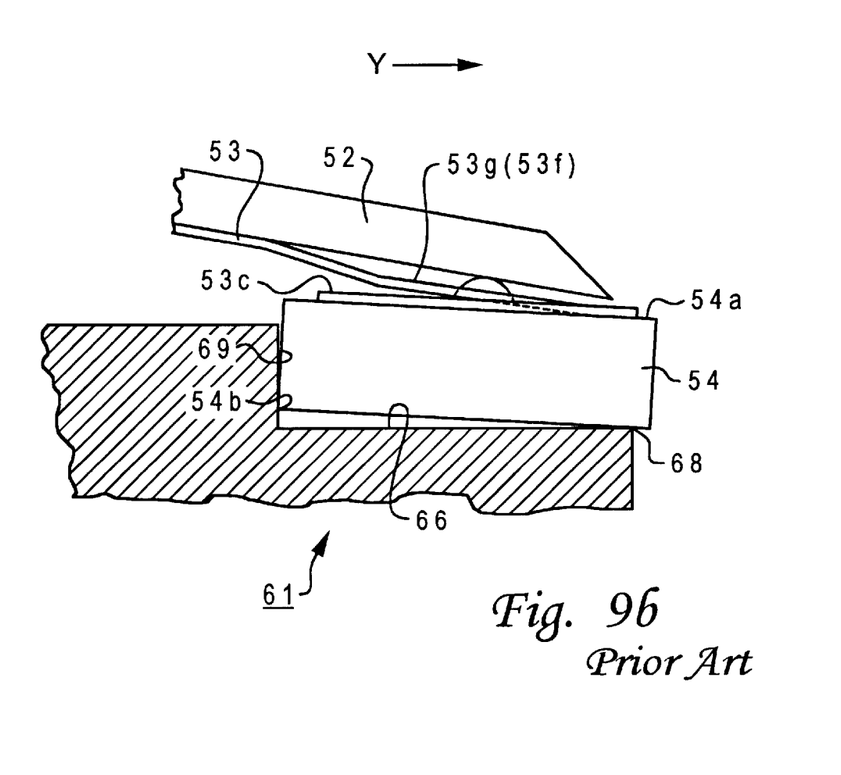
FIG. 9B is a partially enlarged view of a portion in the vicinity of the slider 54 shown in FIG. 9A.

Therefore, the engagement position of the alignment hole 57 in the HG assembly 51 and the alignment pin 62 fitting in the alignment hole 57 moves upward, and also the slider 54 tends to be inclined in the direction of the arrow mark W with two contact portions being the support lines. The two contact portions are a contact portion at which the lower surface of the slider 54 comes into contact with a corner 68 of the slider mount 66 and a contact portion at which a lower surface corner 54b of the slider 54 comes into contact with a slider mounting portion side wall 69 of the bonding jig 61.

However, the HG assembly 51 cannot move in the direction of the arrow mark Y due to the engagement of the alignment pin 62 with the alignment hole 57 in the HG assembly 51. Although the engagement position moves upward to some extent along with the deformation of the flexure arms 53f and 53g, the inclination of the slider 54 in the direction of the arrow mark W does not proceed due to the friction on the contact portions.

As described above, when the HG assembly 51 is separated from the bonding jig 61, the HG assembly 51 is caught by the bonding jig 61 during the separating process and a locked state is sometimes established. If an attempt is made to forcedly separate the HG assembly 51 from the bonding jig to release the HG assembly 51 from this state, there arises a problem in that the flexure is deformed plastically or the bonding portion of the slider is peeled off.

SUMMARY OF THE INVENTION

In a method for separating a head gimbal assembly from a bonding jig, the head gimbal assembly having a bending portion that has elasticity and is bent at a predetermined angle under an unloaded condition, a suspension portion for suspending a slider and an alignment hole for aligning the head gimbal assembly with the bonding jig, which are disposed on one side of the bending portion, and an opening for attachment disposed on the other side of the bending portion, and the method being used to separate the head gimbal assembly from the bonding jig after the slider is bonded to the suspension portion of the head gimbal assembly with the bonding jig.

The slider is held on a slider mounting portion of the bonding jig; an alignment pin is inserted into the alignment hole and a movable pin is inserted into the opening, the alignment pin having a shape of being relatively movable in a predetermined direction through a predetermined width in a state of being inserted in the alignment hole and standing on the bonding jig, and the movable pin being set on the bonding jig; the movable pin is moved in a direction of being separated from the alignment pin to position a portion of the suspension portion at which the slider is to be bonded in a state in which the bend of the bending portion is stretched, and the head gimbal assembly is pressed and fixed on the bonding jig with a clamper to keep the stretched state; and the head gimbal assembly is released from the fixed state having been established by the clamper in a state in which the movable pin is caused to move or to be movable in a direction of coming close to the alignment pin after executing a bonding step and releasing the slider from the held state.

Also, the bonding jig includes a slider mounting portion for mounting and holding the slider thereon; an alignment pin having a shape of being relatively movable in a predetermined direction through a predetermined width in a state of being inserted in the alignment hole and standing on the bonding jig; a movable pin movably held so that a distance between the movable pin and the alignment pin is variable; and a clamper for pressing and fixing the head gimbal assembly on the bonding jig in a state in which the head gimbal assembly is mounted on the bonding jig so that the alignment pin and the movable pin are inserted in the alignment hole and the opening, respectively, and in a state in which a portion of the suspension portion contacting with the slider is positioned with the movable pin moving in a direction of separating from the alignment pin and with the bend of the bending portion is stretched.

Also, in another embodiment, a bonding jig for bonding a slider to a suspension portion of a head gimbal assembly, the head gimbal assembly having a bending portion that has elasticity and is bent at a predetermined angle under an unloaded condition, the suspension portion for suspending the slider and an alignment hole for aligning the head gimbal assembly with the bonding jig, which are disposed on one side of the bending portion, and an opening for attachment disposed on the other side of the bending portion, includes a slider mounting portion for mounting and holding the slider thereon; an alignment pin standing on the bonding jig to be inserted in the alignment hole; an action pin standing at a position such that a distance between the action pin and the alignment pin is substantially equal to a distance between the alignment hole and the opening in a state in which the bend of the bending portion is stretched; and a clamper for pressing and fixing the head gimbal assembly on the bonding jig at a stage at which the head gimbal assembly is mounted on the bonding jig so that the alignment pin and the action pin are inserted in the alignment hole and the opening, respectively, and is configured so that when a relative position of the alignment pin with respect to the alignment hole or a relative position of the action pin with respect to the opening is changed a predetermined amount from the state in which said head gimbal assembly is pressed with the clamper, the alignment pin is disengaged from the alignment hole and the action pin is disengaged from the opening.

Also, when a tab extending on an extension line connecting the opening and the alignment hole is formed at an end on the one side of the head gimbal assembly, the bonding jig may be provided with a tab support having a contact portion with which a tip end portion of the tab comes into contact in a process in which the head gimbal assembly is released from the fixed state established by the clamper so that the bend of the bending portion of the head gimbal assembly is restored.

Further, in the bonding jig of another embodiment described above, the configuration may be such that the action pin is a prismatic portion standing on an upper surface of the bonding jig and a pyramidal portion formed continuously with the prismatic portion, the alignment pin is a columnar portion standing on the upper surface of the bonding jig and a conical portion formed continuously with the columnar portion, and a taper is formed at a portion of the opening facing the bonding jig.

Thus, an object of the present invention is to provide a bonding jig by which a separating operation can be performed smoothly without posing the above problem when an HG assembly having been bonded is separated from the bonding jig for bonding a slider to a flexure tongue of the HG assembly, and a method for separating the HG assembly from the bonding jig.

BRIEF DESCRIPTION OF THE DRAWINGS

FIG. 7 is a configuration view of an essential part of a general HG assembly, FIG. 7A being a top plan view, FIG. 7B being a front view, and FIG. 7C being a perspective view of a tip end portion thereof;

DETAILED DESCRIPTION OF THE PREFERRED EMBODIMENT

Embodiment 1

Figure 1A:
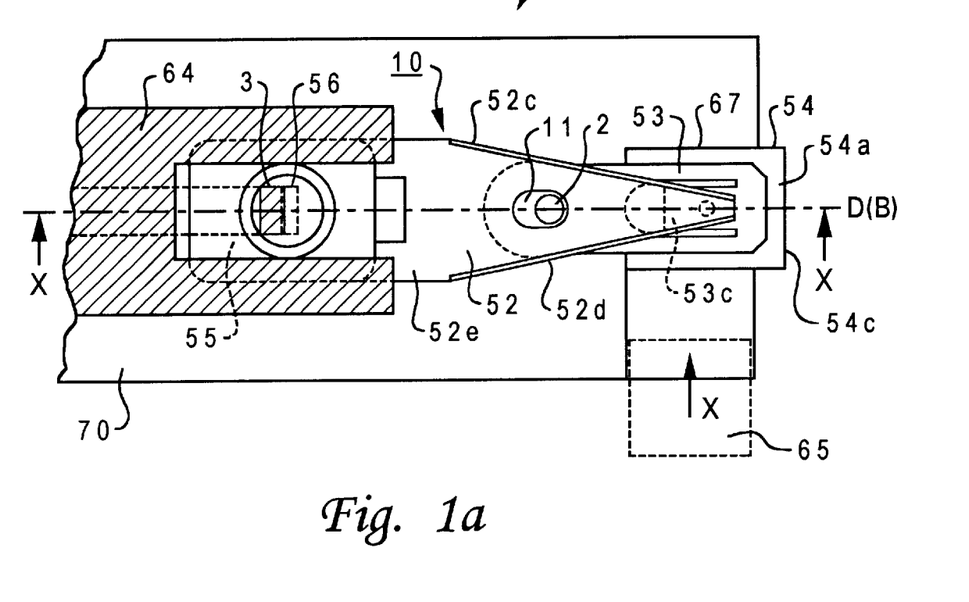
FIG. 1A is a top plan view of an essential part in the case where an HG assembly 10 is mounted on a bonding jig 1 of Embodiment 1 in accordance with the present invention.
Figure 1B:
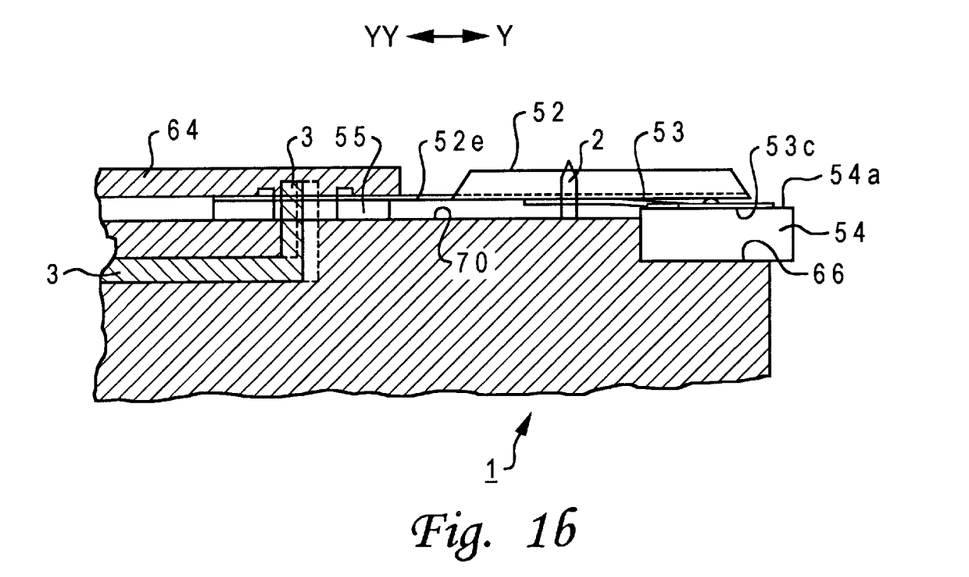
FIG. 1B is a sectional view of the essential part, in which a cross section including the reference line D is viewed in the direction of the arrow mark X.

FIG. 1A is a top plan view of an essential part in the case where a flexure tongue 53c and a slider 54 of an HG assembly 10 are mounted on a bonding jig 1 in accordance with Embodiment 1 of the present invention to bond and fix the slider 54 to the flexure tongue 53c. FIG. 1B is a sectional view of the essential part, in which a cross section including the reference line D passing through the center of an alignment pin 2, which stands on an upper surface 70 of the bonding jig 1, and the movement axis of a movable pin 3 is viewed in the direction of the arrow mark X.

This HG assembly 10 differs from the aforementioned HG assembly 51 shown in FIG. 7 in that an elongated alignment hole 11 is formed on the centerline B of the HG assembly 10 in place of the circular alignment hole 57. Other configuration of the HG assembly 10 is exactly the same as that of the HG assembly 51, so that the same reference numerals are applied to the same elements as those of the HG assembly 51, and the duplicated explanation is omitted.

Also, the boning jig 1 differs from the aforementioned bonding jig 61 shown in FIG. 8 in that the movable pin 3 is disposed in place of the action pin 63, and it has a shape of being relatively movable in the lengthwise direction of the elongated hole through a predetermined width in a state in which the alignment pin 2 is inserted in the alignment hole 11. Other configuration of the bonding jig 1 is exactly the same as that of the bonding jig 61, so that the same reference numerals are applied to the same elements as those of the bonding jig 61, and only the different portions are explained with emphasis thereon.

When the slider 54 is bonded to the flexure tongue 53c, the slider 54 with a predetermined orientation is first mounted on a slider mount 66. The configuration is such that a fixing lever 65 lies at the position indicated by the dotted line at this time not to hinder the work. At a stage at which the slider 54 has been mounted, the fixing lever 65 is moved in the direction of the arrow mark X and presses the slider 54 with a predetermined urging force to hold the slider 54 between the fixing lever 65 and an opposite side wall portion 67. Thereby, the slider 54 is held at a slider mounting portion.

On the other hand, when the HG assembly 10 to which the slider 54 has not been bonded is mounted to the bonding jig 1, the HG assembly 10 is mounted so that the alignment pin 2 of the bonding jig 1 is inserted in the alignment hole 11 in the HG assembly 10, and the movable pin 3 of the bonding jig 1 is inserted in an attachment hole 56 in the HG assembly 10.

The configuration is such that a clamper 64 is moved to a position at which the mounting operation is not hindered by a not illustrated means at this time of mounting. Also, at this time of mounting, the movable pin 3 preferably lies at the initial position (for example, the position indicated by the dotted line) at which both the pins 2 and 3 can be inserted smoothly.

Next, the movable pin 3 is moved in the direction of the arrow mark YY, and the alignment pin 2 is brought into contact with an arcuate portion of the alignment hole 11 while the bend of the HG assembly 10 is stretched. Thereby, the HG assembly 10 is positioned so that the centerline B of the HG assembly 10 agrees with the reference line D of the bonding jig 1. Simultaneously with or subsequently to this positioning work, the clamper 64 is moved to the position shown in the figures of FIG. 1 to press a mount plate 55 of the HG assembly 10 on the upper surface 70 of the bonding jig 1 with a predetermined pressing force and fix the mount plate 55 onto the bonding jig 1.

Thereby, an upper surface 54a of the slider 54 and a lower surface of the flexure tongue 53c keep a state of being pressed on each other with a predetermined pressure. Therefore, an adhesive with low elasticity such as an epoxy adhesive is applied to either one bonding surface before these elements are joined, and this bonding state is kept during a subsequent predetermined drying process, by which these two elements can be bonded firmly or in a temporarily fixed state.

Figure 2A:
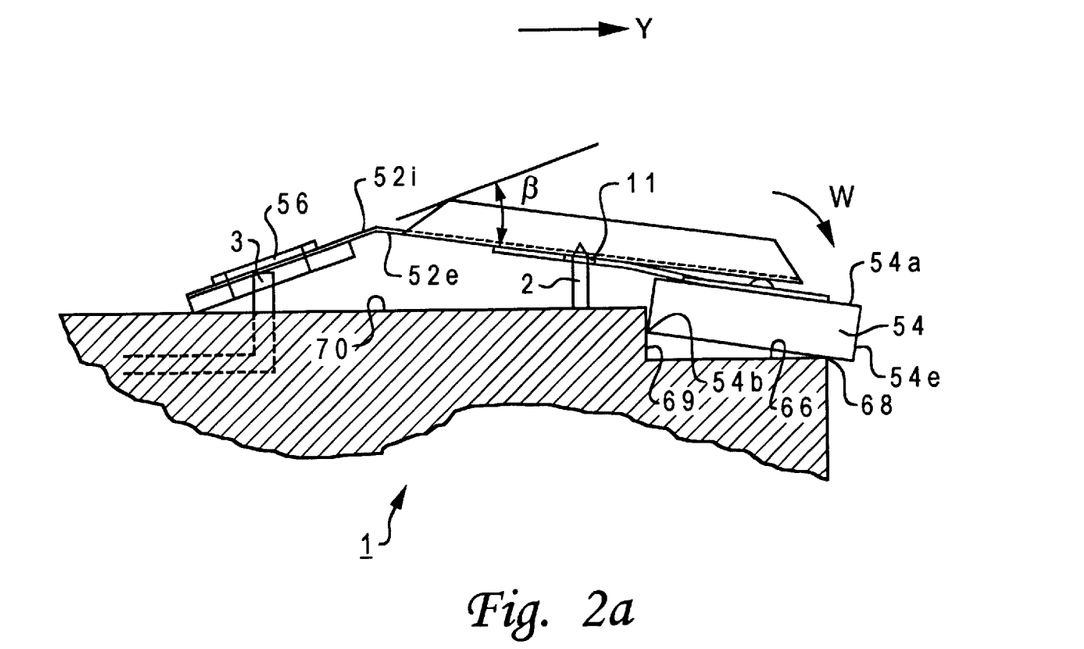
FIG. 2A is an explanatory view showing a status of the HG assembly when the hold of a clamper 64 is released.

After the slider 54 is bonded to the flexure tongue 53c as described above, the HG assembly 10 is separated from the bonding jig 1. For this purpose, the fixing lever 65 pressing the slider 54 is moved again to the position indicated by the dotted line, and further the movable pin 3 is made in a free state, that is, a state of being movable freely in the direction of the arrow mark Y. In order to release the HG assembly 10 from the state shown in FIG. 1, in which the clamper 64 presses the mount plate 55 of the HG assembly 10, the clamper 64 is moved from that position. At this time, the HG assembly 10 tends to be restored to a state in which the bending angle β at a bending portion 52$i$ becomes the aforementioned predetermined angle α as shown in FIG. 2A.

Figure 2B:
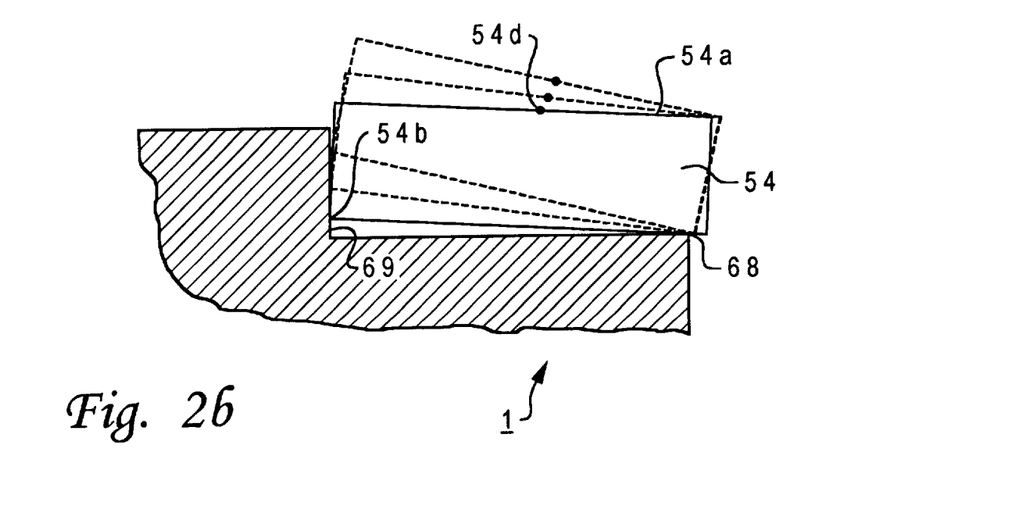
FIG. 2B is an explanatory view for illustrating the movement of a slider 54 shown in FIG. 2A.

At this time, the engagement position of the alignment hole 11 in the HG assembly 10 and the alignment pin 2 fitting in the alignment hole 11 moves upward, and also the slider 54 tends to be inclined in the direction of the arrow mark W with two contact portions being the support lines. The two contact portions are a contact portion at which the lower surface of the slider 54 comes into contact with a corner 68 of the slider mount 66 and a contact portion at which a lower surface corner 54$b$ of the slider 54 comes into contact with a slider mounting portion side wall 69 of the bonding jig 1. FIG. 2B is a view showing the movement path of the slider at this time. As shown in FIG. 2B, a middle point 54$d$ of the upper surface 54$a$ of the slider 54 moves in both directions of the arrow marks Y and Z along with the inclination of the slider 54.

Therefore, along with the inclination of the slider 54, the alignment hole 11 of the HG assembly 10 moves in the direction of the arrow mark Y while inclining with respect to the alignment pin 2, and the attachment hole 56 also moves in the direction of the arrow mark Y while inclining with respect to the movable pin 3. Such relative movement is allowed by the configuration in which the movement relative to the alignment pin 2 is free because the alignment hole 11 is an elongated hole, and a state in which the movable pin 3 passes through the attachment hole 56 with a play can be kept because the movable pin 3 can move freely. Therefore, the bending angle β at a hinge portion 52$e$ of the HG assembly 10 is restored to the aforementioned predetermined angle α without being hindered, so that the HG assembly 10 in this restored natural state can be separated from the bonding jig 1.

Figure 6A:
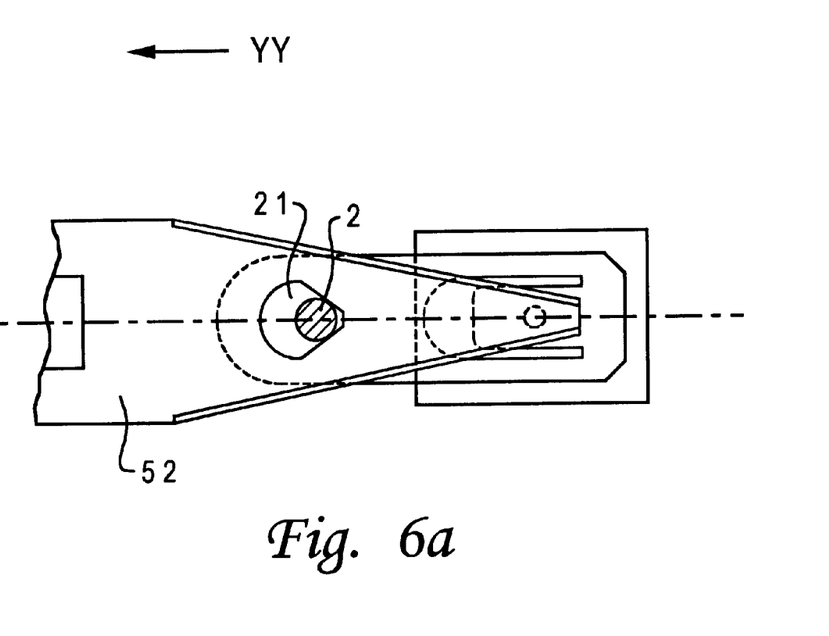
FIG. 6 is an explanatory view showing other examples of the shape of the alignment hole 11 in the HG assembly of Embodiment 1.
Figure 6B:
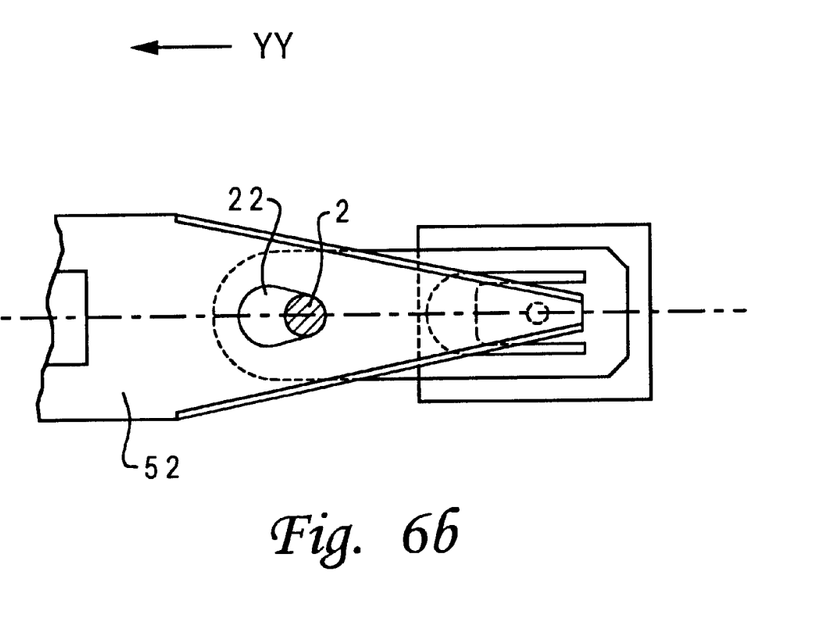

FIGS. 6A and 6B show other examples of the shape of the alignment hole 11 in the HG assembly 10. As shown in FIG. 6A, an alignment hole 21 may have a portion of contact with the alignment pin 2 formed into a wedge shape, or as shown in FIG. 6B, an alignment hole 22 may be in the shape of a tapered elongated hole. For both of these holes, by pulling a load beam 52 in the direction of the arrow mark YY, as in the case of the aforementioned elongated hole 11, the HG assembly 10 can be positioned with respect to the alignment pin 2.

As described above, according to the bonding jig and the method for separating the HG assembly from the bonding jig in accordance with Embodiment 1, when the HG assembly is separated from the bonding jig, the stretched HG assembly can be restored to the original bent state without restriction. Therefore, the HG assembly can be separated from the bonding jig without damage to the HG assembly.

Embodiment 2

Figure 3A:
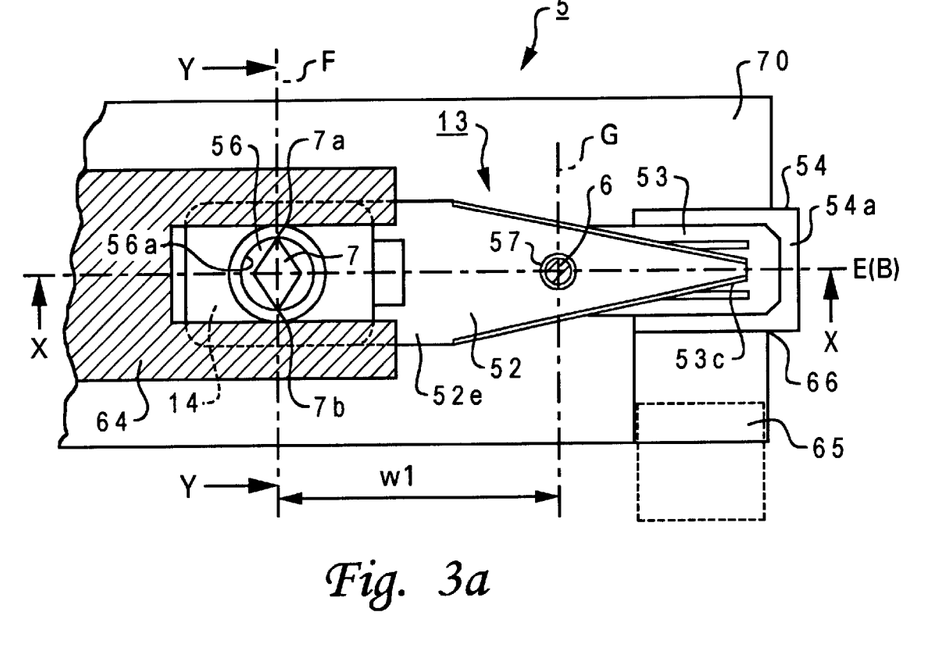
FIG. 3A is a top plan view of an essential part in the case where an HG assembly 13 is mounted on a bonding jig 5 of Embodiment 2 in accordance with the present invention.
Figure 3B:
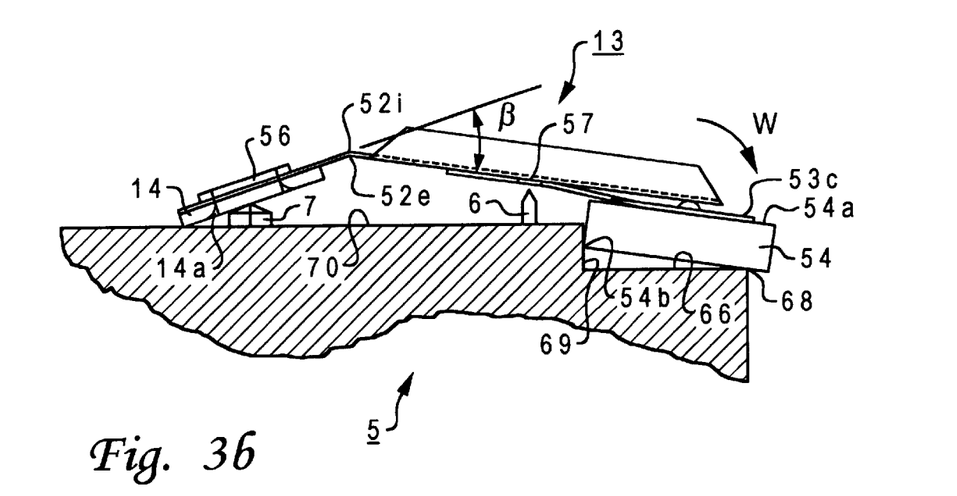
FIG. 3B is a sectional view of the essential part, in which a cross section including the reference line E is viewed in the direction of the arrow mark X.

FIG. 3A is a top plan view of an essential part in the case where the flexure tongue 53$c$ and the slider 54 of an HG assembly 13 are mounted on a bonding jig 5 in accordance with Embodiment 2 of the present invention to bond and fix the slider 54 to the flexure tongue 53$c$. FIG. 3B is a sectional view of the essential part, in which a cross section including the reference line E passing through the center of a notch alignment pin 6, which stands on the upper surface 70 of the bonding jig 5, and a notch action pin 7 is viewed in the direction of the arrow mark X. However, the sectional view of the essential part of FIG. 3B shows a state in a process in which the HG assembly 13 is separated from the boding jig 5 as described later.

Also, this HG assembly 13 differs from the aforementioned HG assembly 51 shown in FIG. 7 in that a taper 14$a$ is formed at the lower end part of the attachment hole 56 in a mount plate 14. Other configuration of the HG assembly 13 is exactly the same as that of the HG assembly 51, so that the same reference numerals are applied to the same elements as those of the HG assembly 51, and the duplicated explanation is omitted. Further, the boning jig 5 differs from the aforementioned bonding jig 61 shown in FIG. 8 in the shapes of the notch alignment pin 6 used in place of the alignment pin 62 and the notch action pin 7 used in place of the action pin 63. Other configuration of the bonding jig 5 is exactly the same as that of the bonding jig 61, so that the same reference numerals are applied to the same elements as those of the bonding jig 61, and only the different portions are explained with emphasis thereon.

Figure 4A:
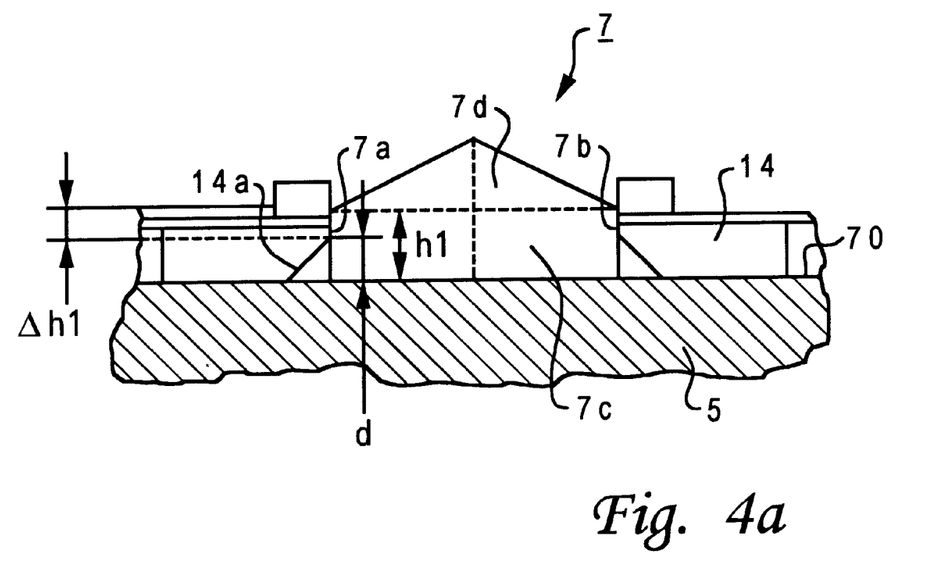
FIG. 4A is a sectional view of a portion in the vicinity of a notch action pin 7, in which a cross section including the reference line F shown in FIG. 3A is viewed in the direction of the arrow mark Y.

FIG. 4A is a sectional view of a portion in the vicinity of the notch action pin 7, in which a cross section including the reference line F that passes through the center of the notch action pin 7 shown in FIG. 3A and is perpendicular to the reference line E is viewed in the direction of the arrow mark Y. Also, FIG. 4B is a sectional view of a portion in the vicinity of the notch alignment pin 6, in which a cross section including the reference line G that passes through the center of the notch alignment pin 6 shown in FIG. 3A and is perpendicular to the reference line E is viewed in the direction of the arrow mark Y.

As shown in FIGS. 3A and 4A, the notch action pin 7 is formed of a prismatic portion 7$c$ standing on the upper surface 70 of the bonding jig 5 and a pyramidal portion 7$d$ formed continuously with the prismatic portion 7$c$. The cross section of the prismatic portion 7$c$ is in the shape of a rhombus, and the length of a diagonal line between ends 7$a$ and 7$b$ in the direction of the reference line F (FIG. 3A) is set slightly shorter than the inside diameter of the attachment hole 56 in the HG assembly 13. Also, as shown in FIG. 4A, the height h1 of a regulation portion of the prismatic portion 7$c$ is set higher than the depth d of the taper 14$a$ formed at the lower end part of the attachment hole 56 in the mount base 14 by a predetermined regulation portion remaining height Dh1 as described later.

Figure 4B:
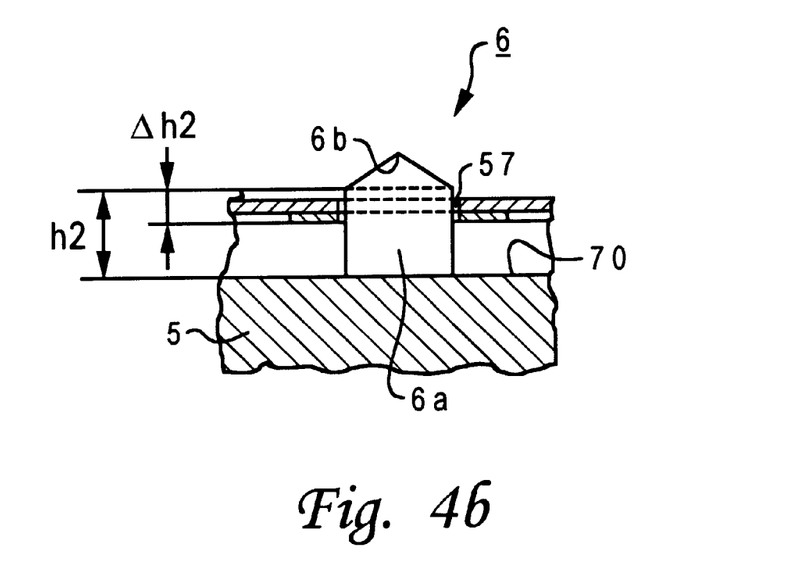
FIG. 4B is a sectional view of a portion in the vicinity of a notch alignment pin 6, in which a cross section including the reference line G shown in FIG. 3A is viewed in the direction of the arrow mark Y.

On the other hand, as shown in FIG. 4B, the notch alignment pin 6 is formed of a columnar portion 6$a$ standing on the upper surface 70 of the bonding jig 5 and a conical portion 6$b$ formed continuously with the columnar portion 6$a$. The height h2 of a regulation portion of the columnar portion 6$a$ is set higher than the height from the upper surface 70 of the bonding jig 5 around the alignment hole 57 when the HG assembly 13 is mounted on the bonding jig 5 in a state in which the bending portion 52$i$ of the HG assembly 13 stretches by a predetermined regulation portion remaining height Dh2 as described later.

In the above-described configuration, when the slider 54 is bonded to the flexure tongue 53$c$, as explained in Embodiment 1, the slider 54 is positioned at the slider mounting portion and is held. When the HG assembly 13 to which the slider 54 has not been bonded is mounted to the bonding jig 5, the HG assembly 13 is mounted so that the notch alignment pin 6 of the bonding jig 5 is inserted in the alignment hole 57 in the HG assembly 13 and the notch action pin 7 of the bonding jig 5 is inserted in the attachment hole 56 in the HG assembly 13. The configuration is such that the clamper 64 is moved to the position at which the mounting operation is not hindered by a not illustrated means at this time of mounting.

Also, in the HG assembly 13, the distance w1 between the notch alignment pin 6 and the notch action pin 7 provided on the bonding jig 5 is set at a distance between these pins in the state in which the bend of the bending portion 52i (FIG. 7B) at the angle α is stretched straight as shown in the example of the HG assembly 51 in FIG. 7A. Therefore, at the stage at which the HG assembly 13 is mounted on the bonding jig 5, the HG assembly 13 is in a stretched state as shown in FIG. 3A. In this state, the clamper 64 is moved to the position shown in FIG. 3A, and presses the mount plate 14 of the HG assembly 13 on the upper surface 70 of the bonding jig with the predetermined pressing force to fix the HG assembly 13.

Thereby, the state in which the upper surface 54a of the slider 54 and the lower surface of the flexure tongue 53c are pressed on each other with the predetermined pressure is kept. Therefore, an adhesive with low elasticity such as an epoxy adhesive is applied to either one bonding surface before these elements are joined, and this bonding state is kept during the subsequent predetermined drying process, by which these two elements can be bonded firmly or in a temporarily fixed state.

After the slider 54 is fixed to the flexure tongue 53c as described above, the HG assembly 13 is separated from the bonding jig 5. For this purpose, the fixing lever 65 pressing the slider 54 is moved to the position indicated by the dotted line, and the clamper 64 is moved from the position of the state shown in FIG. 3A, that is, the state of pressing the mount plate 14 of the HG assembly 13 to release the HG assembly from the pressed state. At this time, the HG assembly 13 tends to be restored to the state in which the bending angle β at a bending portion 52i becomes the aforementioned predetermined angle α0 as shown in FIG. 3B.

At this time, the engagement position of the alignment hole 57 in the HG assembly 13 and the notch alignment pin 6 fitting in the alignment hole 57 moves upward, and also the slider 54 tends to be inclined in the direction of the arrow mark W with two contact portions being the support lines. The two contact portions are a contact portion at which the lower surface of the slider 54 comes into contact with the corner 68 of the slider mount 66 and a contact portion at which the lower surface corner 54b of the slider 54 comes into contact with the slider mounting portion side wall 69 of the bonding jig 5.

By a slight (however, not less than Dh2) upward movement of the engagement position of the alignment hole 57 in the HG assembly 13 and the notch alignment pin 6 at this time, the engagement relationship between these elements is broken off, and the portion of the alignment hole 57 in the HG assembly 13 becomes in a free state. On the other hand, the engagement portions of the mount plate 14 with the ends 7a and 7b of the notch action pin 7 move upward through a distance of not less than Dh1 due to a slight inclination at this time (in the direction opposite to the arrow mark W) (FIG. 4A), so that the upper end of the taper 14a comes at a height not lower than h1, by which the engagement state is left, and this portion also becomes in a free state. Therefore, the bending angle β at the bending portion 52i of the HG assembly 13 is restored to the aforementioned predetermined angle α without being hindered, so that the HG assembly 13 in this restored natural state can be separated from the bonding jig 5.

As described above, according to the bonding jig 5 of Embodiment 2, the heights h1 and h2 of the regulation portions of the notch action pin 7 and the notch alignment pin 6 are set such that the regulation portion remaining heights Dh1 and Dh2 can have proper values, that is, values such that these pins can be disengaged by a slight inclination or displacement of the portions of the HG assembly due to the restoration of the bending portion 52i of the HG assembly 13. Thereby, when the HG assembly 13 is separated from the bonding jig 5, the stretched HG assembly can be restored to the original bent state without restriction. Therefore, the HG assembly can be separated from the bonding jig without damage to the HG assembly.

Embodiment 3

Figure 5A:
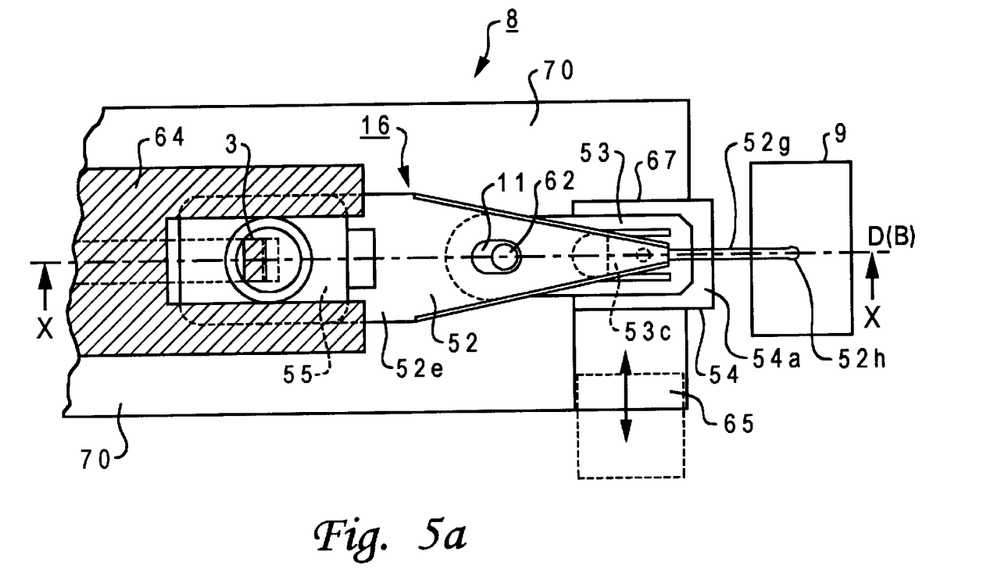
FIG. 5A is a top plan view of an essential part in the case where an HG assembly 16 is mounted on a bonding jig 8 of Embodiment 3 in accordance with the present invention.
Figure 5B:
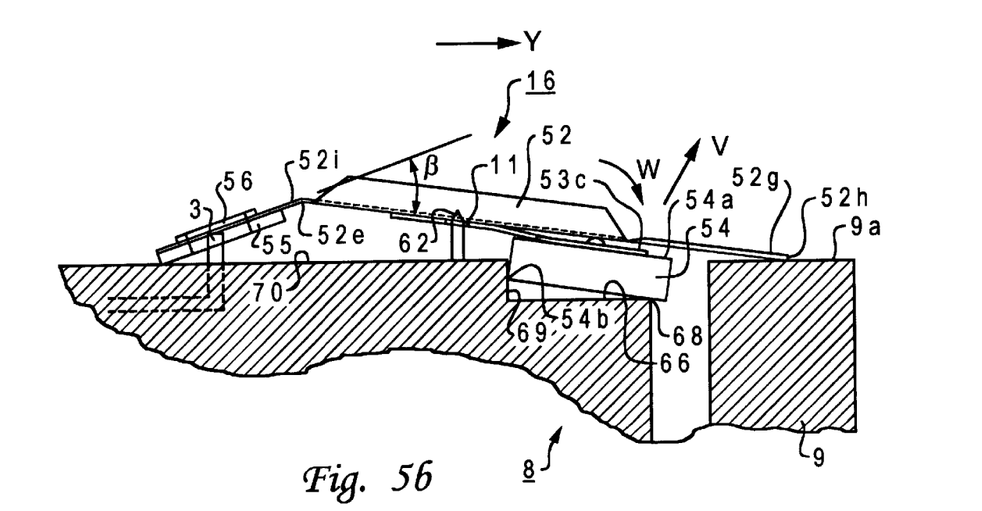
FIG. 5B is a sectional view of the essential part, in which a cross section including the reference line D is viewed in the direction of the arrow mark X.

FIG. 5A is a top plan view of an essential part in the case where the flexure tongue 53c and the slider 54 of an HG assembly 16 are mounted on a bonding jig 8 in accordance with Embodiment 3 of the present invention to bond and fix the slider 54 to the flexure tongue 53c. FIG. 5B is a sectional view of the essential part, in which a cross section including the reference line D passing through the center of a notch alignment pin 62, which stands on the upper surface 70 of the bonding jig 8, and the movement axis of the movable pin 3 is viewed in the direction of the arrow mark X. However, the sectional view of the essential part of FIG. 5B shows a state in a process in which the HG assembly 16 is separated from the boding jig 8 as described later.

Also, this HG assembly 16 differs from the HG assembly 10 of Embodiment 1 shown in FIG. 1A in that a tab 52g is provided at the tip end of the load beam 52. Other configuration of the HG assembly 16 is exactly the same as that of the HG assembly 10, so that the same reference numerals are applied to the same elements as those of the HG assembly 10, and the duplicated explanation is omitted. Further, the bonding jig 8 differs from the bonding jig 1 of Embodiment 1 shown in FIG. 1 in that a tab support 9 is additionally provided. Other configuration of the bonding jig 8 is exactly the same as that of the bonding jig 1, so that the same reference numerals are applied to the same elements as those of the bonding jig 1, and only the different portions are explained with emphasis thereon.

In the above-described configuration, the slider 54 is bonded to the flexure tongue 53c in the same way as in the case of the above-described Embodiment 1, so that the detailed explanation thereof is omitted. FIG. 5A shows a state in which after the aforementioned predetermined bonding process is finished, the clamper 64 presses the mount plate 55 of the HG assembly 16 on the upper surface 70 of the bonding jig 8 with the predetermined pressing force as shown in the figure to fix the HG assembly 16 to the bonding jig 8.

When the HG assembly 16 in a state in which the flexure tongue 53c thereof is bonded to the slider 54 is separated from the bonding jig 8, the fixing lever 65 pressing the slider 54 is moved to the position indicated by the dotted line, and the clamper 64 is moved from the position shown in FIG. 5A to leave the pressing state.

At this time, the HG assembly 16 tends to be restored to the state in which the bending angle β at a bending portion 52i becomes the aforementioned predetermined angle α as shown in FIG. 5B. Therefore, the engagement position of the elongated alignment hole 11 in the HG assembly 16 and the alignment pin 62 fitting in the alignment hole 11 moves upward, and also the slider 54 tends to be inclined in the direction of the arrow mark W with two contact portions being the support lines. The two contact portions are a contact portion at which the lower surface of the slider 54 cornes into contact with the corner 68 of the slider mount 66 and a contact portion at which the lower surface corner 54*b* of the slider 54 comes into contact with the slider mounting portion side wall 69 of the bonding jig 8.

Along with this inclination, the alignment hole 11 in the HG assembly 16 moves in the direction of the arrow mark Y while inclining with respect to the alignment pin 62, and the attachment hole 56 also moves in the direction of the arrow mark Y while inclining with respect to the movable pin 3. Such relative movement is allowed by the configuration in which the movement relative to the alignment pin 62 is free because the alignment hole 11 is an elongated hole, and the state in which the movable pin 3 passes through the attachment hole 56 with a play can be kept because the movable pin 3 can move freely. Along with the inclination of the slider 54, a tip end portion 52*h* of the tab 52*g* provided at the tip end of the load beam 52 comes into contact with an upper surface 9*a* of the tab support 9. After that, the HG assembly 16 inclines with this contact point being a fulcrum, so that the slider 54 inclines in the direction of the arrow mark W and also moves in the direction of the arrow mark V. Therefore, a state in which the slider 54 is separated from the slider mount 66 of the bonding jig 8 is established.

As described above, according to the bonding jig 8 of Embodiment 3, when the HG assembly 16 having the tab 52*g* at the tip end thereof is separated from the bonding jig 8, not only the stretched HG assembly can be restored to the original bent state without restriction, but also a state in which the slider 54 is separated from the slider mounting portion of the bonding jig 8 is established. Therefore, as compared with Embodiment 1 in which the slider is in contact with the slider mounting portion at this time, the safety and work efficiency of the slider can further be increased when the HG assembly 16 is separated from the bonding jig 8.

The notch action pin 7, which is the action pin of the above-described Embodiment 2, has a shape of a combination of a prism and a pyramid. However, the shape of the action pin is not limited to this, and the action pin may be formed of a prismatic portion only or may have a shape of a combination of an elliptic column and an elliptic cone.

Further, the bonding jig 8 of the above-described Embodiment 3 is configured so that the tab support 9 is added to the bonding jig 1 of Embodiment 1. However, the configuration is not limited to this, and may be such that the tab support 9 is added to the bonding jig 5 of Embodiment 2. Further, the upper surface 9*a* of the tab support 9 in the above-described Embodiment 3 may be subjected to anti-slipping treatment or may be inclined to make the contacting tab less liable to slip.

Still further, the alignment pin 2 of the above-described Embodiment 1 has a circular shape in cross section. However, the shape of the alignment pin 2 is not limited to this, and the cross section thereof may have an elliptic or semicircular shape to further increase the width of relative movement with respect to the alignment hole, or other various modifications can be made.

Also, terms "upper" and "lower" have been used in the explanation of the above-described embodiments. However, these terms have been used for convenience only, and do not restrict the positional relationship in the state in which the bonding jig is arranged.

The present invention has several advantages. According to the separating method defined in claim 1 and the bonding jig defined in claim 2 in accordance with the present invention, when the HG assembly is separated from the bonding jig, the stretched HG assembly is restored to the original bent state without restriction. Therefore, the HG assembly can be separated from the bonding jig without damage to the HG assembly. Also, according to the bonding jig defined in claim 3 or 5 in accordance with the present invention, the same effect as that of the bonding jig defined in claim 2 can be achieved by merely making the shapes of the alignment pin and the action pin predetermined ones. Therefore, a bonding jig that has a simple configuration and is advantageous in terms of cost can be provided.

Also, according to the bonding jig defined in claim 4 in accordance with the present invention, for the HG assembly having the tab 52 at the tip end thereof, not only the stretched HG assembly is restored to the original bent state without restriction, but also the slider can be separated from the slider mounting portion of the bonding jig. Therefore, the safety and work efficiency of the slider can further be increased compared with the bonding jig defined in claim 2 when the HG assembly is separated from the bonding jig.

What is claimed is:

1. A method for separating a head gimbal assembly from a bonding jig, the head gimbal assembly having a bending portion that has elasticity and is bent at a predetermined angle under an unloaded condition, a suspension portion for suspending a slider and an alignment hole for aligning the head gimbal assembly with the bonding jig, which are disposed on one side of the bending portion, and an opening for attachment disposed on the other side of the bending portion, and the method being used to separate the head gimbal assembly from the bonding jig after the slider is bonded to the suspension portion of the head gimbal assembly with the bonding jig, comprising the steps of:

holding the slider on a slider mounting portion of the bonding jig;

inserting an alignment pin into the alignment hole and inserting a movable pin into the opening, the alignment pin having a shape of being relatively movable in a predetermined direction through a predetermined width in a state of being inserted in the alignment hole and standing on the bonding jig, and the movable pin being set on the bonding jig;

moving the movable pin in a direction of being separated from the alignment pin to position a portion of the suspension portion at which the slider is to be bonded in a state in which the bend of the bending portion is stretched, and pressing and fixing the head gimbal assembly on the bonding jig with a clamper to keep the stretched state; and releasing the head gimbal assembly from the fixed state having been established by the clamper in a state in which the movable pin is movable in a direction of coming close to the alignment pin after executing a bonding step and releasing the slider from the held state.

2. A bonding jig for bonding a slider to a suspension portion of a head gimbal assembly, the head gimbal assembly having a bending portion that has elasticity and is bent at a predetermined angle under an unloaded condition, the suspension portion for suspending the slider and an alignment hole for aligning the head gimbal assembly with the bonding jig, which are disposed on one side of the bending portion, and an opening for attachment disposed on the other side of the bending portion, comprising:

a slider mounting portion for mounting and holding the slider thereon;

an alignment pin having a shape of being relatively movable in a predetermined direction through a predetermined width in a state of being inserted in the alignment hole and standing on the bonding jig;

a movable pin movably held so that a distance between the movable pin and the alignment pin is variable; and a clamper for pressing and fixing the head gimbal assembly on the bonding jig in a state in which the head gimbal assembly is mounted on the bonding jig so that the alignment pin and the movable pin are inserted in the alignment hole and the opening, respectively, and in a state in which a portion of the suspension portion contacting with the slider is positioned with the movable pin moving in a direction of separating from the alignment pin and with the bend of the bending portion being stretched.

3. The bonding jig according to claim 2, wherein:

a tab extending on an extension line connecting the opening and the alignment hole is formed at an end on the one side of the head gimbal assembly; and a tab support is provided, the tab support having a contact portion with which a tip end portion of the tab comes into contact in a process in which the head gimbal assembly is released from the fixed state established by the clamper so that the bend of the bending portion of the head gimbal assembly is restored.

4. A bonding jig for bonding a slider to a suspension portion of a head gimbal assembly, the head gimbal assembly having a bending portion that has elasticity and is bent at a predetermined angle under an unloaded condition, the suspension portion for suspending the slider and an alignment hole for aligning the head gimbal assembly with the bonding jig, which are disposed on one side of the bending portion, and an opening for attachment disposed on the other side of the bending portion, comprising:

a slider mounting portion for mounting and holding the slider thereon;

an alignment pin standing on the bonding jig to be inserted in the alignment hole;

an action pin standing at a position such that a distance between the action pin and the alignment pin is substantially equal to a distance between the alignment hole and the opening in a state in which the bend of the bending portion is stretched; and a clamper for pressing and fixing the head gimbal assembly on the bonding jig at a stage at which the head gimbal assembly is mounted on the bonding jig so that the alignment pin and the action pin are inserted in the alignment hole and the opening, respectively, wherein when a relative position of the alignment pin with respect to the alignment hole or a relative position of the action pin with respect to the opening is changed a predetermined amount from the state in which the head gimbal assembly is pressed with the clamper, the alignment pin is disengaged from the alignment hole and the action pin is disengaged from the opening.

5. The bonding jig according to claim 4, wherein:

a tab extending on an extension line connecting the opening and the alignment hole is formed at an end on the one side of the head gimbal assembly; and a tab support is provided, the tab support having a contact portion with which a tip end portion of the tab comes into contact in a process in which the head gimbal assembly is released from the fixed state established by the clamper so that the bend of the bending portion of the head gimbal assembly is restored.

6. The bonding jig according to claim 4, wherein:

the action pin is a prismatic portion standing on an upper surface of the bonding jig and a pyramidal portion formed continuously with the prismatic portion;

the alignment pin is a columnar portion standing on the upper surface of the bonding jig and a conical portion formed continuously with the columnar portion; and a taper is formed at a portion of the opening facing the bonding jig.

\* \* \* \* \*